US012560140B2

(12) United States Patent
Masti

(10) Patent No.: US 12,560,140 B2
(45) Date of Patent: Feb. 24, 2026

(54) INJECTOR AND RAIL ASSEMBLY

(71) Applicant: PHINIA DELPHI LUXEMBOURG SARL, Belvaux (LU)

(72) Inventor: Ravish S. Masti, Bangalore (IN)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/835,605

(22) PCT Filed: Feb. 1, 2023

(86) PCT No.: PCT/EP2023/052486
§ 371 (c)(1),
(2) Date: Aug. 2, 2024

(87) PCT Pub. No.: WO2023/148238
PCT Pub. Date: Aug. 10, 2023

(65) Prior Publication Data

US 2025/0223938 A1 Jul. 10, 2025

(30) Foreign Application Priority Data

Feb. 2, 2022 (IN) ............................. 202241005631
Mar. 18, 2022 (GB) ...................................... 2203838

(51) Int. Cl.
*F02M 61/14* (2006.01)
*F02M 55/02* (2006.01)
*F02M 61/16* (2006.01)

(52) U.S. Cl.
CPC ........ *F02M 55/025* (2013.01); *F02M 61/168* (2013.01); *F02M 2200/16* (2013.01); *F02M 2200/855* (2013.01); *F02M 2200/856* (2013.01)

(58) Field of Classification Search
CPC ........... F02M 55/025; F02M 2200/856; F02M 61/168; F02M 2200/05; F02M 2200/855; F02M 35/10216
(Continued)

(56) References Cited

U.S. PATENT DOCUMENTS 10,801,457 B1 * 10/2020 Masti .................. F02M 63/028
10,995,720 B1 5/2021 Masti
(Continued)

FOREIGN PATENT DOCUMENTS

DE 10162203 A1 * 7/2003 ........... F02M 55/025
EP 1255038 A2 * 11/2002 ............. F02M 61/00

OTHER PUBLICATIONS

International Search Report for PCT/EP2023/052486 dated Apr. 20, 2023, 3 pages.

*Primary Examiner* — George C Jin
*Assistant Examiner* — Teuta B Holbrook
(74) *Attorney, Agent, or Firm* — WARNER NORCROSS + JUDD LLP

(57) ABSTRACT

An injector and rail assembly for a common rail fuel injection system comprises a fuel injector comprising a head for receiving fuel and a neck region for supporting the head end, a common rail housing defining a reservoir volume for storing fuel at high pressure and including a stem defining a passage for delivering high pressure fuel from the reservoir volume to the head end of the fuel injector, the stem including a threaded portion, and an adaptable mounting arrangement for sealingly mounting the fuel injector to the stem of the common rail housing. The adaptable mounting arrangement comprises a primary nut mounted on the threaded portion of the stem and an annular seal being
(Continued)

located on the stem, the primary nut having an internal channel and the head of the fuel injector being received within the internal channel.

11 Claims, 9 Drawing Sheets

(58) Field of Classification Search
USPC .................................................. 123/456, 470
See application file for complete search history.

(56) References Cited

U.S. PATENT DOCUMENTS

| | | | | |
|---|---|---|---|---|
| 2009/0179421 | A1* | 7/2009 | Stieler .................... | F02M 55/02 123/456 |
| 2011/0030656 | A1* | 2/2011 | Pepperine .............. | F02M 61/14 123/470 |
| 2011/0108005 | A1* | 5/2011 | Nishizawa ........... | B23K 1/0008 228/159 |
| 2012/0006297 | A1* | 1/2012 | Worthington ........ | F02M 55/025 123/456 |

* cited by examiner

INJECTOR AND RAIL ASSEMBLY

CROSS-REFERENCE TO RELATED APPLICATIONS

This application is the U.S. National Stage of International Application No. PCT/EP2023/052486 filed on 1 Feb. 2023, which claims priority to and all advantages of Indian Application No. 202241005631 filed on 2 Feb. 2022 and United Kingdom Application No. 2203838.4 filed on 18 Mar. 2022, the contents of which are incorporated herein by reference.

FIELD OF THE INVENTION

This invention relates to an injector and rail assembly for use in a common rail fuel injection system. In particular, the invention relates to an injector and rail connection assembly for use in a common rail fuel injection system for an internal combustion engine.

BACKGROUND

In a gasoline direct injection fuel system, the fuel from a rail is supplied to a plurality of injectors via a respective rail socket. The injectors need to be connected to the rail sockets using a mechanical connector assembly and the most appropriate arrangement for the mechanical connector assembly depends on the way the injector is installed in the engine. Two configurations are possible; clamped injector installations where the injectors are clamped to the engine head and 'hanging' injector installations where the injectors are suspended from the rail sockets. The mechanical connector assembly must be structurally strong, easy to mount and prevent fuel leakage while allowing fuel to flow from the rail to the injector. However, it is an inconvenience for manufacturers to have different types of mechanical assembly for different injector installations as it creates inefficiencies for manufacture, supply and installation.

Existing mechanical connector assemblies rely on elastomer O-rings at the injector-socket interface. However, there is an increasing demand to improve fuel efficiency and reduce exhaust emissions which means injection is required at high fuel pressures, preferably in excess of 500 bar. This creates a challenge for the sealing requirements as the elastomer seals are prone to performance degradation and failure over a long service life. The wide temperature range to which the seals are subjected over their service life are also prejudicial to seal performance.

It is against this background that the invention has been devised.

SUMMARY OF THE INVENTION

According to the present invention, there is provided an injector and rail assembly for a common rail fuel injection system; the injector and rail assembly including a fuel injector comprising a head end for receiving fuel and a neck region for supporting the head end; a common rail housing defining a reservoir volume for storing fuel at high pressure and including a stem defining a passage for delivering high pressure fuel from the reservoir volume to the head end of the fuel injector, the stem including an outer threaded portion, and an adaptable mounting arrangement for sealingly mounting the fuel injector to the stem of the common rail housing, the adaptable mounting arrangement a primary nut mounted on the threaded portion of the stem and annular seal being located on the stem, the primary nut having an internal channel and the head of the fuel injector being received within the internal channel; and a further nut mounted on the neck of the injector so that a radially outer surface of the further nut engages with the internal channel of the primary nut.

It is one advantage of the injector and rail assembly that it can be adapted for use with both clamped injector installations and suspended injector installations, using the same assembly parts. The same set of core parts are required for both clamped and suspended injector installations. This provides a cost advantage and an efficiency of manufacture and supply.

In one embodiment the assembly further includes a secondary nut (e.g. a top nut) which engages with an external surface (e.g. an upper surface) of the primary nut. For example, the assembly may comprise a secondary nut mounted on the stem to engage with an external surface of the primary nut as well as interfacing with the annular seal.

In one embodiment, the further nut may be a slotted nut comprising a slot to enable mounting of the slotted nut into the internal channel of the primary nut.

In one embodiment, the further nut may be resiliently deformable to enable mounting of the further nut into the internal channel of the primary nut.

In one embodiment, the annular seal may be a C-section annular seal.

In one embodiment, the annular seal may be formed from metal.

In one embodiment, the annular seal may be engaged sealingly with an internal surface of the primary nut.

A further benefit of this invention is that a metallic annular seal can be mounted on the stem, avoiding the disadvantages of elastomer seals which can be prone to cracks, abrasion and cuts and performance degradation over their service life.

In one embodiment, the primary nut may be provided with a recess in an end-face of the primary nut, the recess defining an internal surface, and wherein the annular seal is received within the recess.

In one embodiment, the annular seal may interface sealingly with first and second surfaces of the recess which are perpendicular to one another, with a surface of the secondary nut and with a surface of the stem.

In one embodiment, the annular seal may interface sealingly with first and second surfaces of the stem which are perpendicular to one another and with the internal channel of the primary nut.

In one embodiment, the head of the injector may include a substantially part-spherical surface which forms a seal with the internal channel of the primary nut within which it is received.

In one embodiment, the internal channel may include a conical-wall region which engages with the substantially part-spherical surface of the head of the injector.

It is another advantage of the fuel rail and injector assembly that fuel leakage is prevented at the interface between the head of the injector and the conical-walled portion and improves the overall durability of the fuel injection system.

It is another advantage of the fuel rail and injector assembly that the mounting arrangement can be implemented with one of several different fuel-seal interface surface areas which enables the size and shape of the fuel-seal interface surface area to be optimized based on the requirements.

In another aspect of the invention, there is provided an adaptable mounting arrangement for an injector and rail assembly for a common rail fuel injection system, the adaptable mounting arrangement comprising; a primary nut for mounting on a stem of a common rail housing defining a reservoir volume for fuel, the primary nut defining an injector surface towards the injector, a rail-facing surface towards the common rail housing, and an internal channel for receiving a head end of the fuel injector, in use; a nut configured to permit mounting of the nut on a neck of the fuel injector, in use, so that a radially outer surface of the nut engages with the internal channel of the primary nut; and the arrangement further comprising an annular seal being mountable on the stem of the common rail housing.

It will be appreciated that preferred and/or optional features of the first aspect of the invention may be incorporated alone or in appropriate combination in other aspects of the invention also.

BRIEF DESCRIPTION OF THE DRAWINGS

In order that the invention may be more readily understood, preferred non-limiting embodiments thereof will now be described, by way of example only, with reference to the accompanying drawings, in which:

FIG. 3 is a perspective view of a primary nut of the injector and rail assembly in

FIG. 2;

Figure 1:
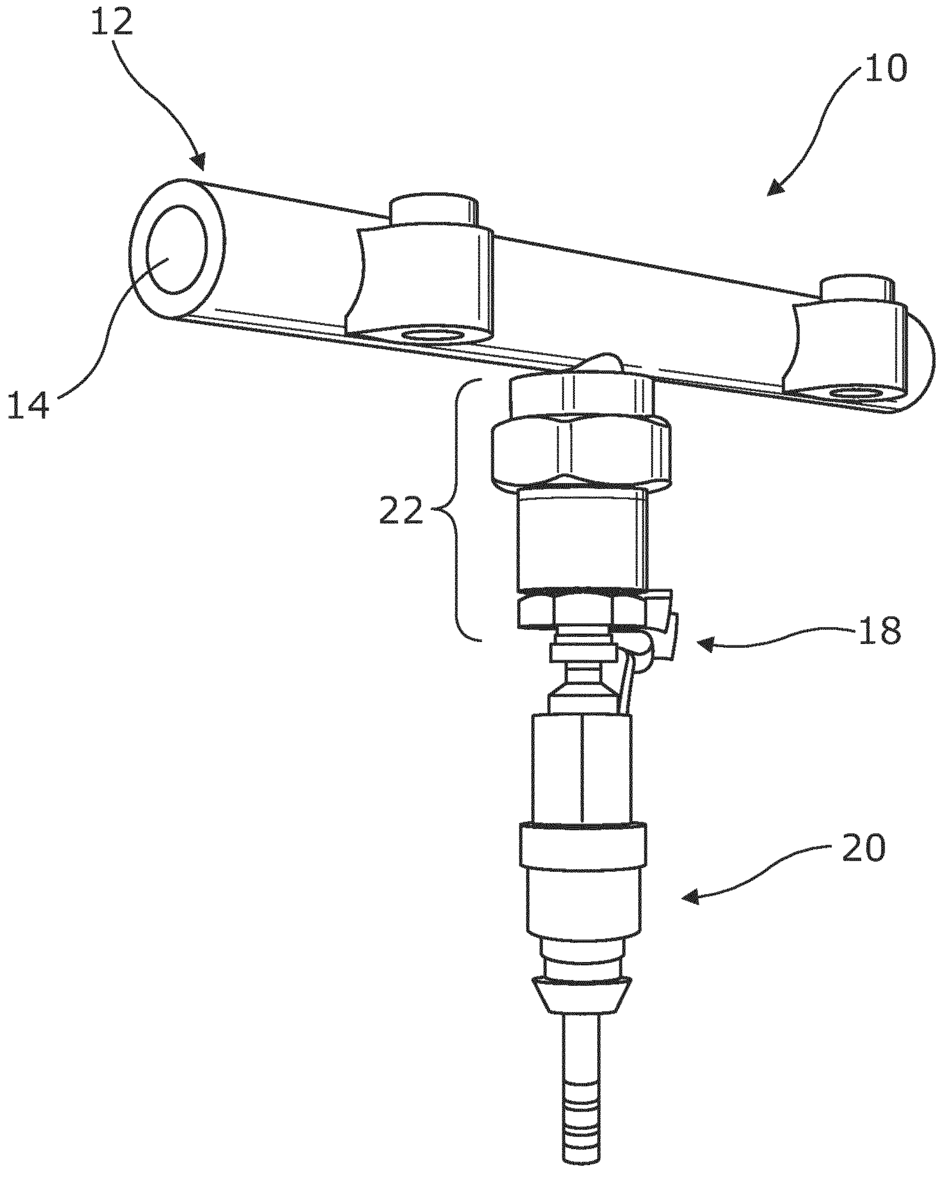
FIG. 1 is a perspective view of an injector and rail assembly of a first embodiment of the invention with the injector clamped to the engine head.

In the drawings, as well as in the following description, like features are assigned like reference signs.

SPECIFIC DESCRIPTION

Figure 2:
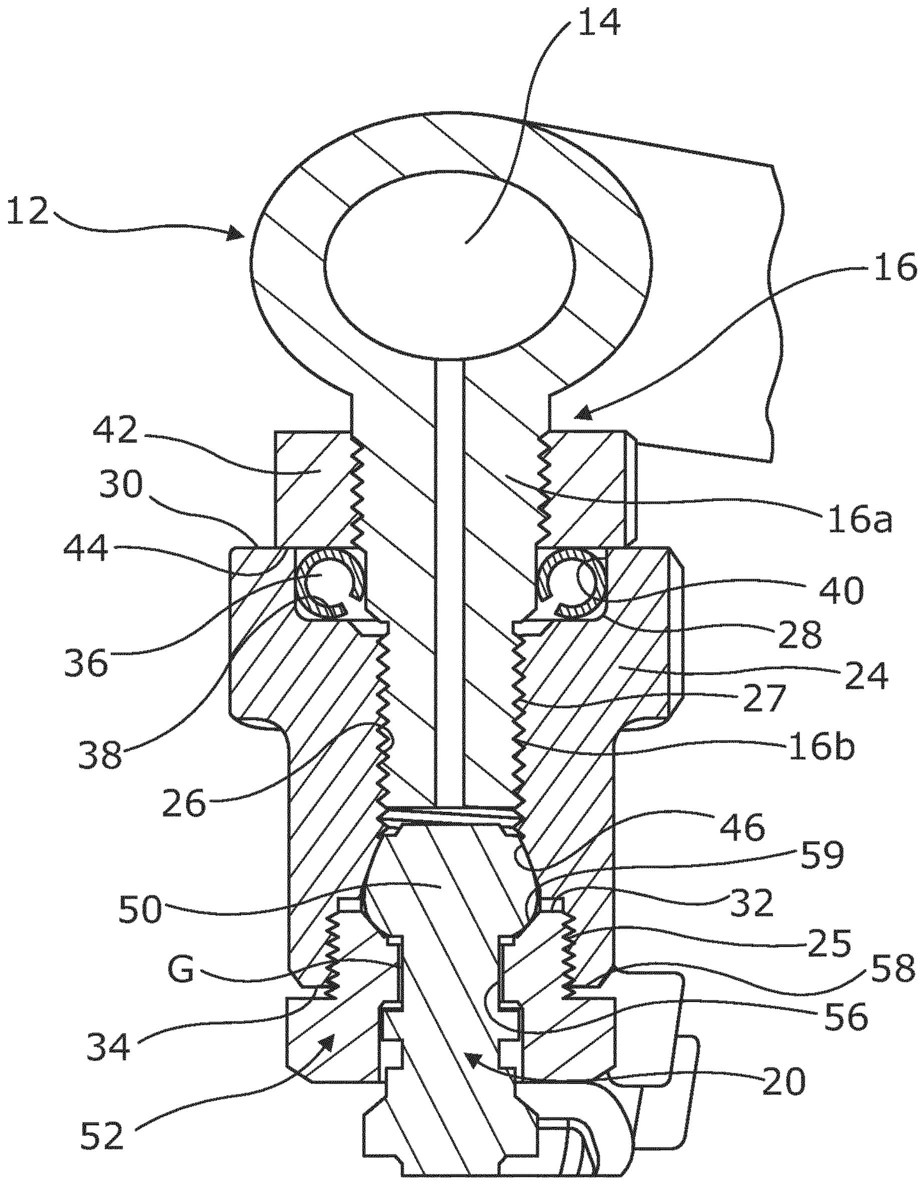
FIG. 2 is a cross-sectional view of the injector and rail assembly in FIG. 1.

Referring to FIGS. 1 and 2, an injector and rail assembly, referred to generally as 10, for a fuel system of a gasoline direct injection engine includes a common rail housing 12 defining a reservoir or rail volume 14 for storing fuel at high pressure and including a stem 16 (only visible in FIG. 2) defining a passage for delivering high pressure fuel from the reservoir volume 14 to the head end 18 of a fuel injector, referred to generally as 20, which is clamped to the rail housing 12. The injector has a longitudinal axis which is aligned with the longitudinal axis of the stem 16. The stem 16 is typically forged or brazed onto the main rail housing 12. The injector-rail connection, in the form of an adaptable mounting arrangement, is identified generally as item 22. In practice, several injectors may be clamped along the length of the common rail housing depending on the number of cylinders in the engine. A stem, such as the stem 16 in FIG. 2, defines a passage for delivering high pressure fuel from the reservoir volume 14 to the head end of a respective one of the fuel injectors. There is no socket in this arrangement, as in the prior art, and instead the invention relies on an adaptable mounting arrangement to securely connect the injector to the stem 16 of the rail housing 12, as described in further detail below.

Figure 3:
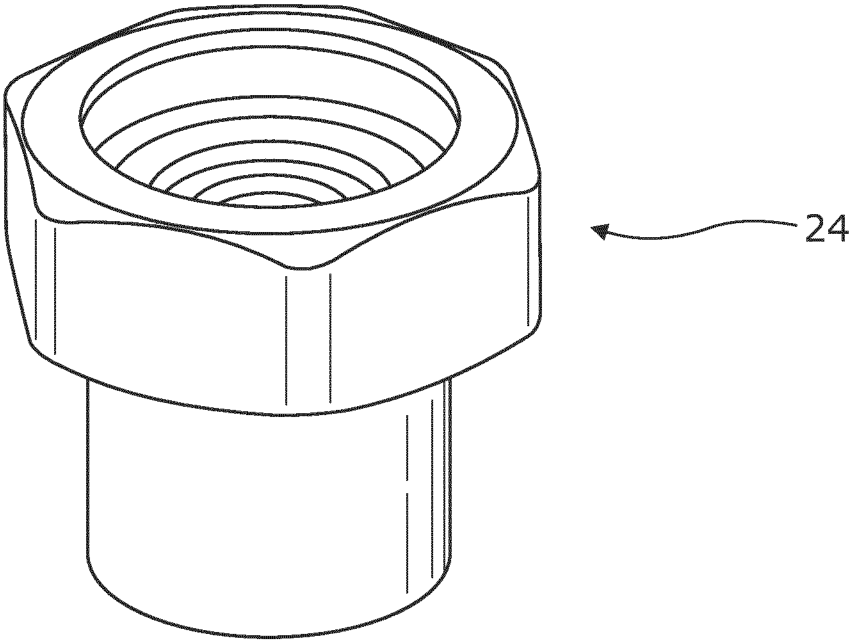

The stem includes at least two regions of differing diameter. An upper region of the stem 16 is of a first, relatively larger diameter and includes an upper outer threaded portion 16*a*. A lower region of the stem 16 is of a second, relatively smaller diameter and includes a lower outer threaded portion 16*b*. The adaptable mounting arrangement 22 is provided on the stem 16 for sealingly mounting the fuel injector 20 to the stem 16. Referring also to FIG. 3, the adaptable mounting arrangement includes a primary nut 24 for mounting on the lower threaded portion 16*b* of the stem 16. The primary nut 24 defines an internal channel 26 which includes an upper threaded region 27 which corresponds to the lower threaded region 16*b* of the stem 16. The internal channel 26 also includes an enlarged recess 28 in the upper external surface 30 of the primary nut 24 (at the rail end of the primary nut 24), which is referred to as the upper recess 28. The internal channel 26 also includes an enlarged recess 32 (which is referred to as the lower recess 32) in a lower injector-facing end surface 34 of the primary nut 24 (at the injector end of the primary nut) which includes an internal threaded region 25.

A metallic annular seal 36 of C-shaped cross-section is located on the stem 16 (not visible in FIG. 1) and resides within the upper recess 28. The upper recess 28 is defined by internal surfaces of the primary nut 24 in the form of a lower surface or floor 38 and a radial wall 40 which is perpendicular to the lower surface or floor 38. A secondary nut 42 (also referred to as the top nut) is carried on the upper threaded portion 16*a* of the stem 16. An upper surface of the annular seal 36 engages with a lower surface 44 of the secondary nut 42. The annular seal 36 therefore interfaces with the first and second perpendicular surfaces 38, 40 of the upper recess 28, a surface of the secondary nut 42 and a portion of the stem 16 (i.e. there are four surfaces of contact for the annular seal 36).

Figure 4:
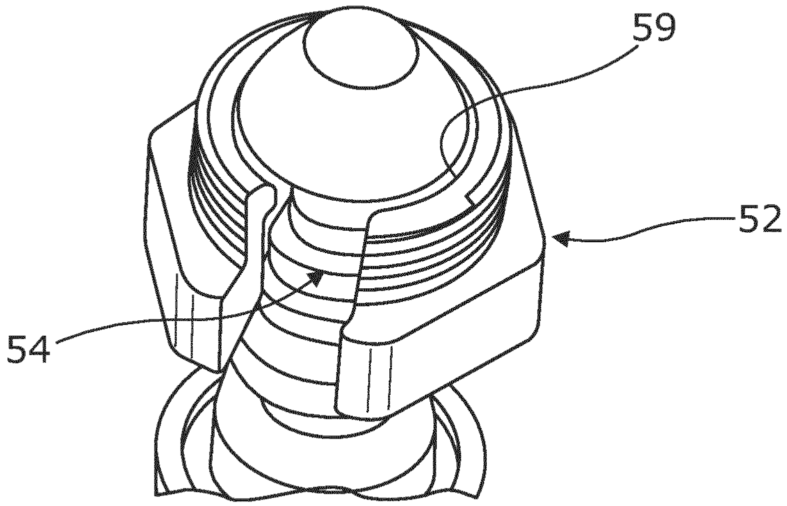
FIG. 4 is a perspective view of a slotted nut of the injector and rail assembly in FIG. 2.

The lower recess 32 at the injector end of the primary nut 24 includes a conical-walled portion 46 which opens into a vertical-walled portion which is the lower threaded region 25 of the lower recess 32. The injector 20 includes an injector head 50 of part-spherical form which is received within the conical-walled portion 46 of the internal channel. The head 50 of the injector 20 is of at least part-spherical form and engages with the conical-walled portion 46 of the lower recess 32 to form a fuel-seal interface. Advantageously, this prevents fuel leakage at the interface between the head 50 of the injector 20 and the conical-walled portion 46 and improves the overall durability of the fuel injector. A tertiary nut 52 resides within the threaded portion 25 of the lower recess 32 at the injector end of the primary nut 24. The tertiary nut 52 takes the form of a slotted nut 52 which includes a slot 54 to enable assembly of the slotted nut 52 onto the injector 20, as best seen in FIG. 4 and as described further below. The slotted nut 52 defines an internal channel 56 of varying diameter.

The head 50 of the injector 20 is carried on an injector neck which extends down through the internal channel 56 defined by the slotted nut 52. With the slotted nut 52 mounted on the neck of the injector 20, a radially outer threaded portion 58 of the slotted nut 52 engages with the threaded region 25 of the lower recess 32 in the vertical-walled portion of the lower recess 32. The region of the internal channel 56 of the slotted nut 52 which corresponds to the outer threaded portion 58 defines a gap G with the neck of the injector 20. The gap G permits some tilt of the injector axis relative to the longitudinal axis of the mounting assembly 22, but is sized to limit this tilt to around 2 to 3 degrees. Advantageously, this provides some tolerance for the injector 20 to tilt about the injector axis which enables ease of assembly, whilst limiting the tilt to a relatively small angle which maintains the stability and rigidity of the injector 20. With the slotted nut 52 threaded into the lower recess 32 of the primary nut 24, a conical recess 59 at the upper end of the slotted nut 52 supports the lower portion of the part-spherical injector head 50 in such a way to permit, together with the ball/cone interface at the portion 46, an inclined orientation or tilt of the injector axis with respect to the longitudinal axis of the stem 16.

When the adaptable mounting assembly 22 is to be used with a clamped injector installation, the following steps of assembly are followed, as described with reference to FIGS. 5(*a*) to (*g*).

Figures 5A, 5B, 5C, 5D, 5E, 5F:
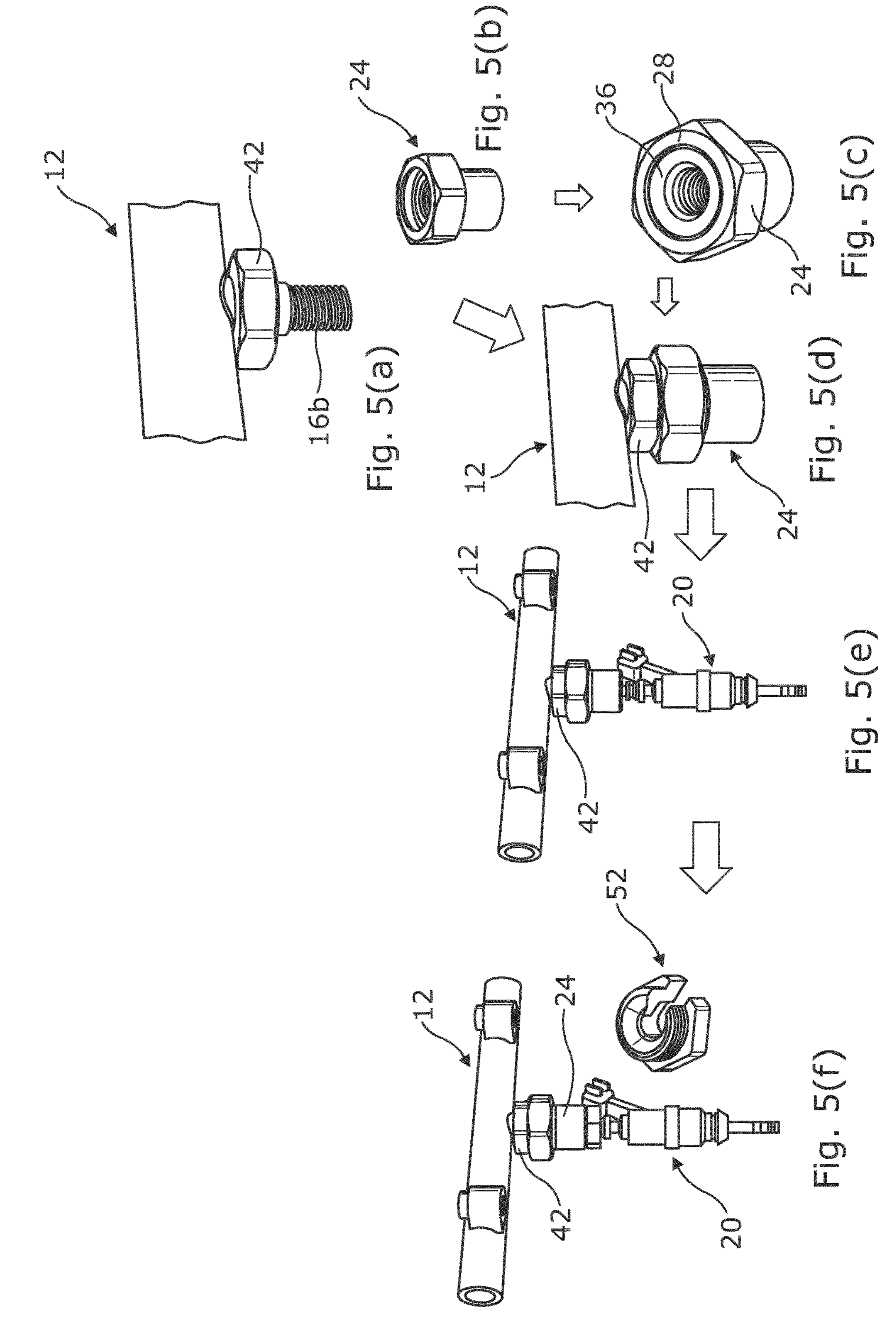
FIGS. 5(*a*) to (*f*) are perspective views to show the installation steps for the injector and rail assembly in FIG. 2 when applied to a clamped injector installation.

Referring to FIG. 5, as a first step, the secondary nut 42 is inserted onto the upper threaded portion 16*a* of the stem 16 of the rail housing (step (a)). The annular seal 36 is then located in the upper recess 28 in the primary nut 24 (step (b) and (c)) and the primary nut 24, together with the seal 36, is introduced onto the lower threaded portion 16*b* of the stem 16 (step (d)). The head 50 of the injector 20 is then partially inserted into the lower end of the primary nut 24 (step (e)). The slotted nut 52 is then introduced onto the neck of the injector 20, inserted in a lateral direction relative to the injector axis, by inserting the slot 54 over the neck (step (f)) as the respective threaded portions of the slotted nut 52 and the lower recess 32 engage and the slotted nut 52 is threaded onto the lower recess 32. This action pulls the head 50 of the injector 20 towards the conical recess 46 of the primary nut 24 to engage the parts together. It is important that the head 50 of the injector is only partially, and not fully, inserted into the primary nut 24 at this time, otherwise the slotted nut 52 cannot be mounted onto the injector 20.

Once these parts have been assembled, the injector 20 is aligned into the engine pocket (not shown) and is clamped onto the engine head (not shown), and the rail housing 16 is bolted onto the engine head. The primary nut 24 is turned to establish full contact with the head 50 of the injector 20 in a fluid-tight sealing manner. The secondary nut 42 is then fully tightened to lock onto the primary nut 24 and to establish a high-pressure seal around the annular seal 36. The slotted nut 52 is then fully tightened to establish a strong connection between the primary nut 24 and the injector 20.

The assembly process terminates with the installation taking the form shown in FIG. 2.

The conical-walled portion 46 of the lower recess 32 and its engagement with the part-spherical head 50 of the injector 20 provides the advantage of a ball-cone mechanical interface which can accommodate any minor misalignment of the injector axis with the longitudinal axis of the stem 16*a*, 16*b*, as well as any tilt of the injector axis. The primary nut 24 can then be turned to adjust vertically and engaged to seal with the head 50 of the injector 20. This adjustment helps to avoid any gap formation between the underside of the rail mounting boss (not illustrated) and the top of the engine head (not shown) due to tolerance variations which accumulate during mounting of the rail system to the engine head.

The aforementioned steps describe the connection of the fuel injector 20 to the rail housing 16 in an assembly where the fuel injector 20 is clamped to engine head. The adaptable mounting assembly 22 may also be implemented to connect the injector 20 to the rail housing 12 in an installation where the injector 20 is suspended from the stem 16 into the injector pocket (not shown) on the engine head, but is not clamped.

The assembly of the primary nut 24 with the annular seal 36 and the secondary nut 42 onto the stem 16*a*, 16*b* of the rail housing 16 follows the same sequence of steps ((a) to (e)) as for the installation in FIG. 5.

Figure 6:
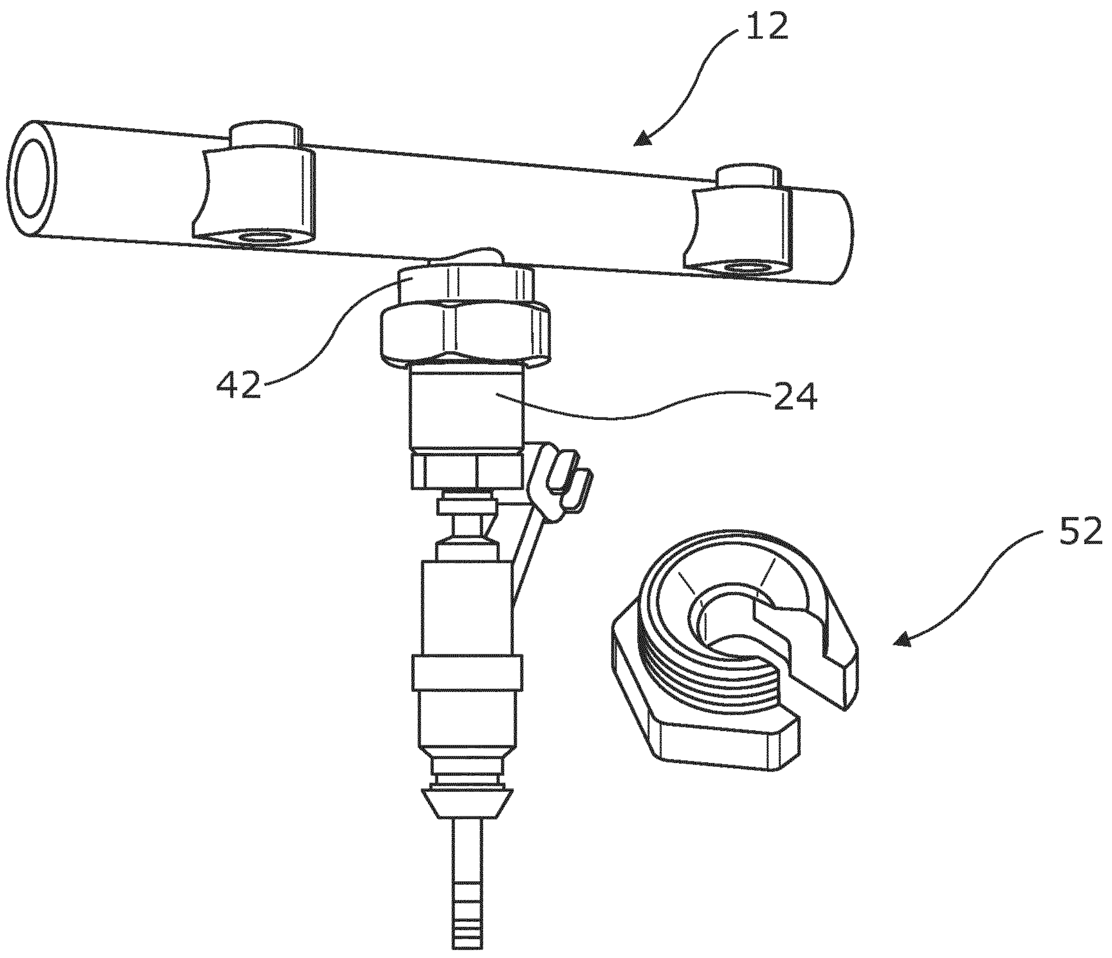
FIG. 6 is a perspective view to show the final installation step for the injector and rail assembly in FIG. 2 when applied to a hanging/suspended injector installation.

Referring to FIG. 6, and as for the suspended injector installation, the slotted nut 52 is introduced laterally relative to the longitudinal axis of the injector 20 and is threaded into the threaded portion 25 of the lower recess 32 in the primary nut 24. The rail 12 is then mounted on the engine head (not illustrated) and the injector 20 is aligned in the injector pocket of the engine head. The primary nut 24 is then tightened to bring it into contact with the head 50 of the injector 20. The slotted nut 52 is then fully tightened within the lower recess 32 onto the neck of the injector 20 to establish a fluid-tight seal between these parts at the ball/cone interface. The secondary nut 42 is then fully tightened onto the primary nut 24 to establish the sealing interface between the annular seal 36 and the upper recess 28 in the primary nut 24. The assembly process terminates with the installation taking the form shown in FIG. 2. Whilst visually it will be appreciated that the final installation of the injector and rail assembly is the same for the clamped injector installation as for the suspended installation, it will be appreciated that the final steps of the installation differ with regard to how the complete injector and rail assembly is put together with the engine head.

Figure 7:
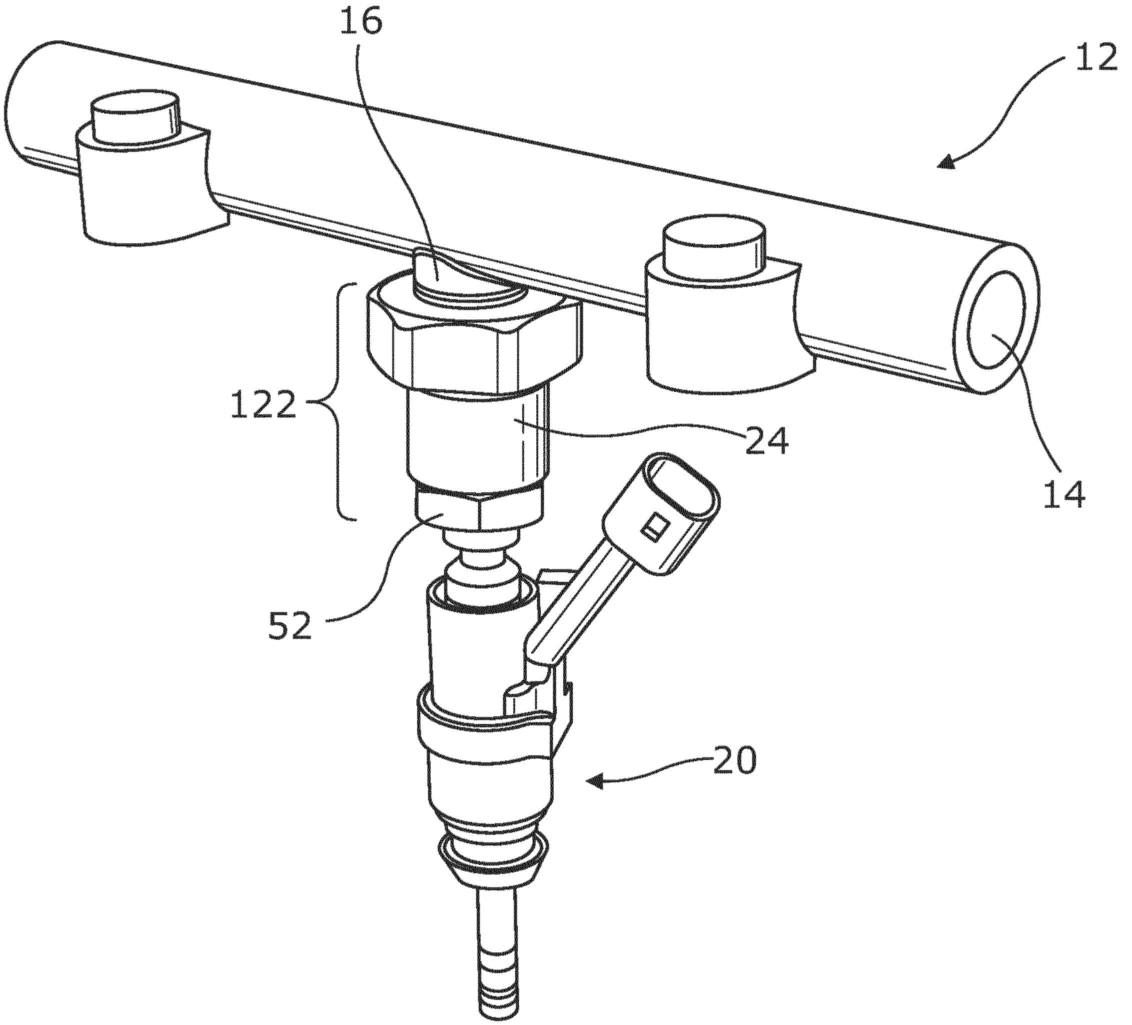
FIG. 7 is a perspective view of an injector and rail assembly of a second embodiment of the invention with the injector suspended from the engine head.
Figure 8:
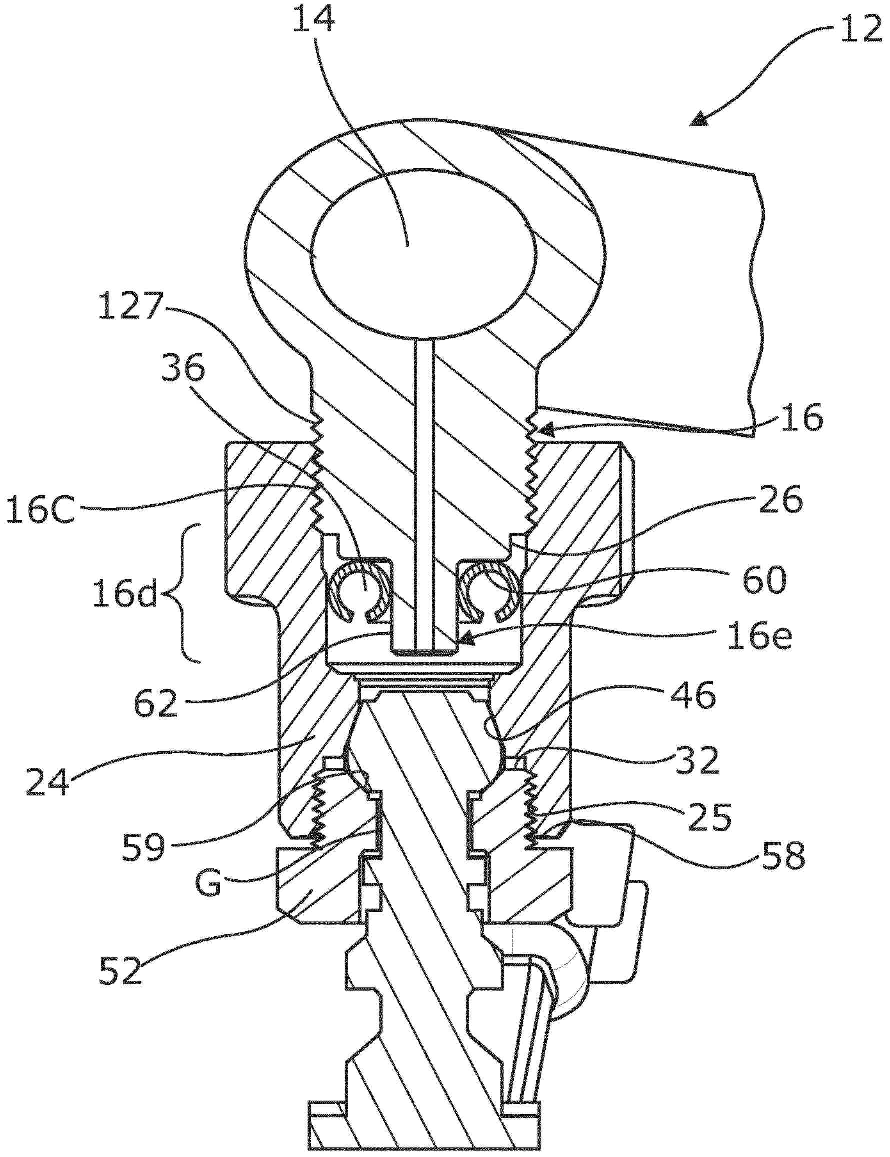
FIG. 8 is a cross-sectional view of the injector and rail assembly in FIG. 7.

Referring to FIGS. 7 and 8, in an alternative embodiment of the invention the adaptable mounting assembly 122 need not include the secondary nut of the previous embodiment. In this embodiment the adaptable mounting assembly 122 includes only the primary nut 24 and the slotted nut 52. Similar parts to those shown in the previous Figures are denoted with the same reference numerals and will not necessarily be described in further detail.

In this embodiment the stem 16 of the rail housing 12 takes a different form to that shown in FIG. 2. The stem 16 includes only one threaded portion 16*c* and includes a region of stepped diameter 16*d* which terminates in a tip end 16*e* of the stem 16. As for the previous embodiment, the primary nut 24 defines an internal channel 26. The stepped diameter region 16*d* is defined by perpendicular surfaces 60, 62 which define a convenient location for the annular seal 36. The outer surface of the annular seal 36 therefore has three surfaces of interface, two surfaces which engage with the stem 16 at surfaces 60, 62 and one surface which engages with the internal channel 26 of the primary nut 24. In this embodiment the internal channel 26 includes an upper threaded region 127 to engage with a threaded portion 16*c* on the stem 16 and a lower threaded region 25 to engage with the threaded portion 58 on the slotted nut 52.

The internal channel 26 of the primary nut 24 includes a lower recess 32 of the same form as that shown in FIG. 2. The lower recess 32 therefore includes a conical-walled portion 46 and a vertical-walled threaded portion 25. In other words, the internal channel 26 therefore includes the conical-walled portion 46 and the vertical-walled portion 25. The injector in FIGS. 7 and 8 has the same configuration as described previously, including a neck supporting a head 50 of part spherical form. As in the previous embodiment, the upper portion of the part-spherical head 50 of the injector 20 engages with the conical-walled portion 46 in a sealing manner and the lower portion of the part-spherical head 50 engages with the conical recess 59 in the slotted nut 52. There is a gap G between the surface of the internal channel 56 in the slotted nut 52 which corresponds to the threaded region 25 of the lower recess 32 and the injector head 50 so as to permit tilt of the injector 20 relative to the axis of the injector pocket (not shown) on the engine head.

The assembly steps for the injector and rail assembly in FIG. 8 will now be described with reference to FIGS. 9(*a*) to (*e*) for an injector installation in which the injectors are suspended from the engine head.

Initially the annular seal 36 is located over the stem 16 of the rail housing 12 (steps (a) and (b)) in a push-fit. The primary nut 24 is then inserted over the stem 16 (step (c)) so that the annular seal 36 is sandwiched between the stem 16 and the surface of the internal channel 26 in the primary nut 24. The seal 36 therefore engages sealingly with the internal surface of the primary nut 24, and with the perpendicular surfaces 60, 62 of the stepped region **16*d* of the stem 16 to define three interface surfaces for the seal 36. Also the sealing interfaces are tolerance dimensioned such that the annular seal 36 would resiliently compress to establish a fluid-tight seal between the stem 16 and the primary nut 24 in the region of the annular seal 36. During the fuel injection system operation, the pressure of fuel exerts a radial force on the inside wall of the C-section seal 36 to expand the seal and adds to the sealing functionality of the seal. The injector 20 is then inserted partially into the internal channel of the primary nut 24 at the lower end (injector facing end) (step (d)). The slotted nut 52 is then inserted laterally onto the injector neck (i.e. perpendicular to the injector axis) and into the lower recess 32 (step (e)) and is threaded into the internal threaded portion 25 of the lower recess 32. If the head 50 of the injector 20 is fully inserted into the primary nut 24 in step (d) then the slotted nut 52 cannot be mounted into the injector 20, so it is important to only partially insert it. Then the part-spherical head 50 of the injector 20 engages with the conical-walled portion 46 of the lower recess 32. The action of threading the slotted nut 52 onto the lower recess 32 pulls the head 50 of the injector 20 towards the conical recess 46 to engage the parts fully together. The assembly then takes the form of the arrangement in FIG. 8**.

The rail 12 with the injector 20 (the injector and rail assembly) is then mounted onto the engine head (not illustrated) by means of bolts. The injector 20 is aligned appropriately inside the engine pocket in which it is to be received. The final tightening of the slotted nut 52 relative to the primary nut 24 establishes a fluid-tight sealing between the conical-walled portion 46 of the recess in the primary nut 24 and the part-spherical head 50 of the injector 20. As described previously the ball/cone interface between the injector 20 and the primary nut 24 permits a degree of tilt of the injector axis (and as permitted by the gap G) in cases where the injector axis and the axis of the injector pocket on the engine head are not exactly aligned.

Figures 9A, 9B, 9C, 9D, 9E:
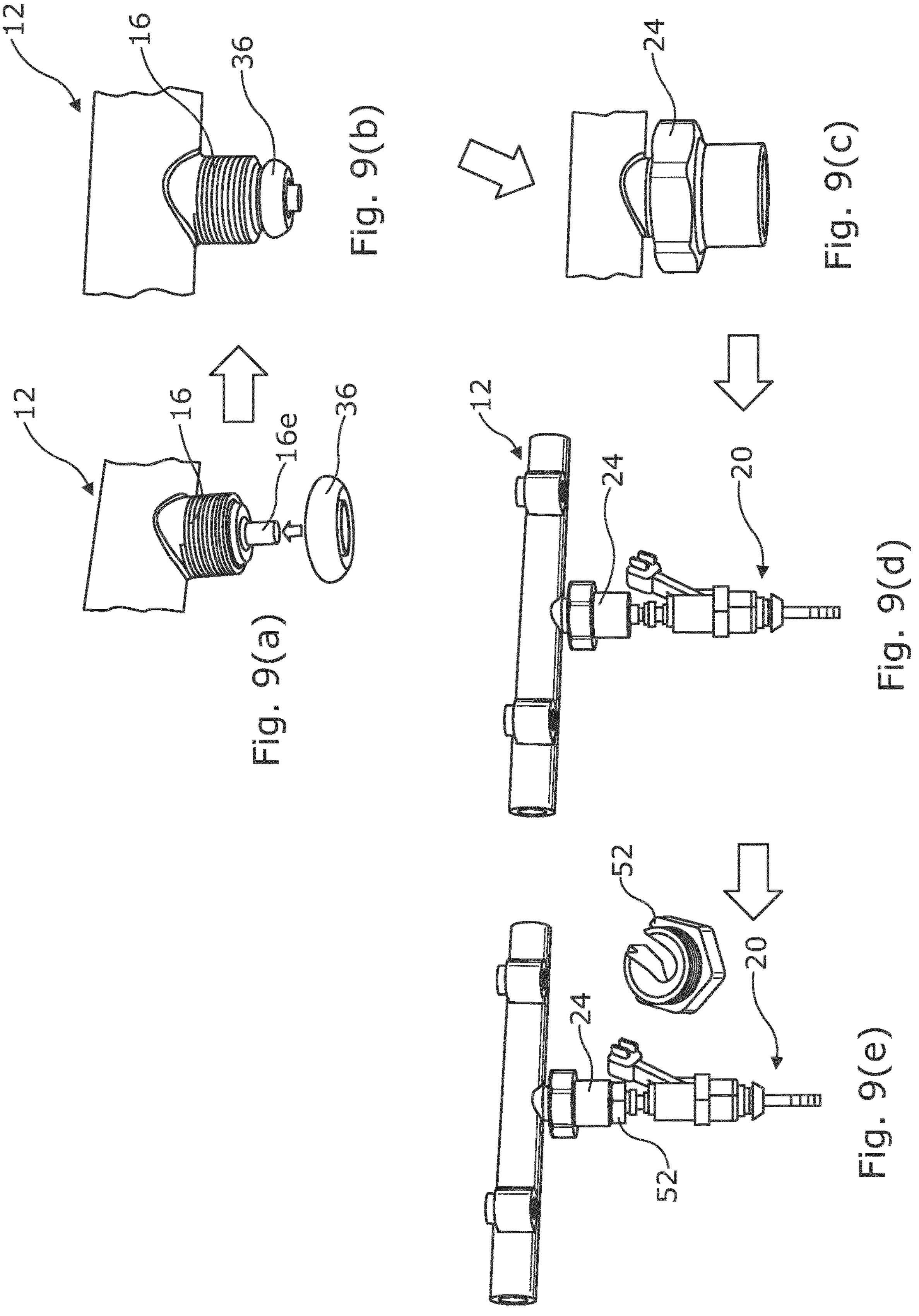
FIGS. 9(*a*) to (*e*) are perspective views to show the installation steps for the injector and rail assembly in FIG. 7 when applied to a hanging/suspended injector installation.

The aforementioned sequence of assembly steps described for a suspended injector assembly are the same for an injector installation in which the injectors are clamped to the engine head, up to and including step (c) in FIG. 9.

Figure 10A:
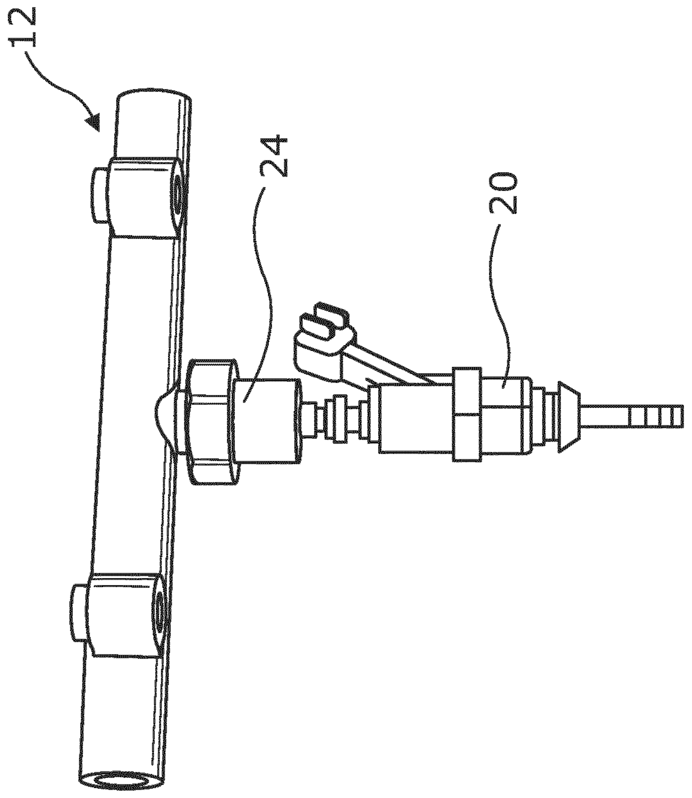
FIGS. 10(*a*) and (*b*) are perspective views to show the installation steps for the injector and rail assembly in FIG. 7 when applied to a clamped injector installation.
Figure 10B:
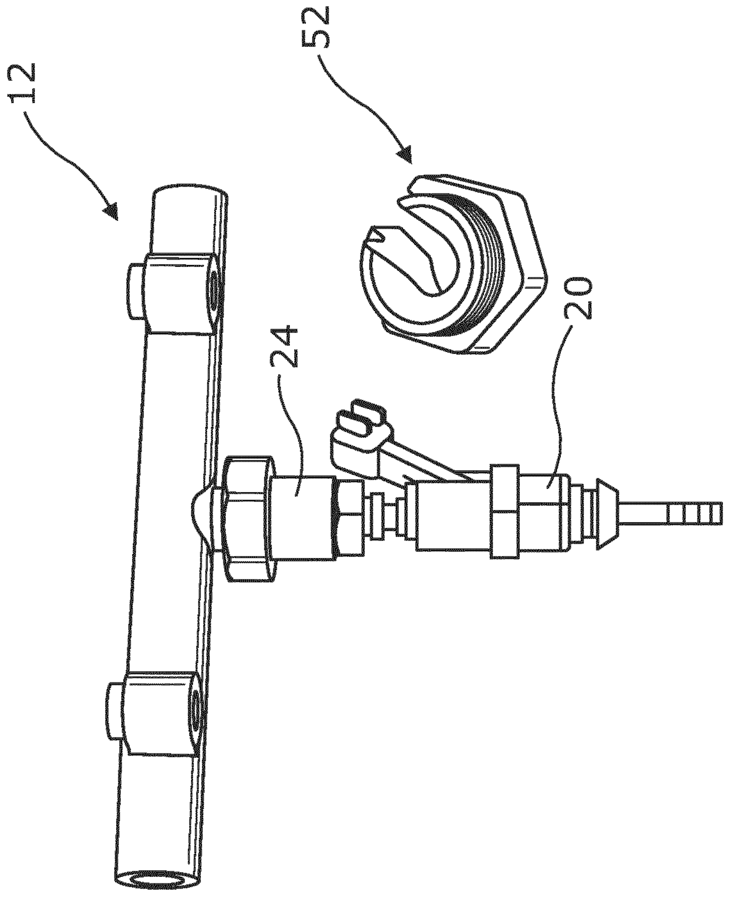

For the clamped injector assembly, referring to FIG. 10(*a*), with the primary nut 24 threaded onto the threaded portion **16*c* of the stem 16 and the annular seal 36 sandwiched between the parts, the injector 20 is aligned into the injector pocket within the engine head and is clamped in position on the head. The rail 12 is then bolted onto the engine head. The slotted nut 52 is then inserted over the injector neck. The primary nut 24 is then tightened until a fluid-tight seal is established between the internal channel of the primary nut 24 and the injector head 50 at the ball/cone interface (step (b)). The slotted nut is threadingly engaged into the lower recess 32 at the injector-end of the primary nut 24, and the slotted nut 52** is fully tightened.

It will be appreciated that for both a suspended injector configuration and a clamped injector configuration the mounting assembly parts are the same, comprising the primary nut 24, the slotted nut 52 and the annular seal 36. This provides the advantage of cost and benefits the manufacturing and assembly process, reducing the requirement for multiple different connection arrangements for different injector mounting configurations (e.g. clamped or suspended). The benefits described previously, regarding tilt of the injector axis through the ball/cone interface between the injector and the primary nut and between the injector and the slotted nut, and the sealing of the primary nut 24 to the stem 16 via the annular seal 36, are also realized in the assembly in FIGS. 7 to 10.

It will be appreciated by a person skilled in the art that the invention could be modified to take many alternative forms to that described herein, without departing from the scope of the appended claims. For example, in other embodiments the slotted nut 52 need not include the slot 54 and may instead take the form of a resilient (i.e. deformable) solid section nut. Also, the ball/cone interface between the head 50 of the injector 20 and the conical-walled portion of the internal channel 26 in the primary nut 24 may be of a different form (e.g. cone on cone) whilst still permitting good sealing and sufficient degree of tilt of the injector axis. The surface area at the fuel-seal interface is sized and shaped to be sufficient to prevent leakage of the fuel at high operating pressures. In addition, it is important that the surface area of the fuel-seal interface is not so large that the dynamic forces acting on the fuel injection system result in wear and tear over a large surface of the injector head 50 and conical-walled portion 46, which may lead to performance degradation over time. An advantage of the invention is that it provides a flexible mounting assembly 22 which can be designed to accommodate one of several different fuel-seal interface surface areas. The size and shape of the fuel-seal interface surface area can therefore be optimized based on the requirements.

LIST OF PARTS

10—injector and rail assembly
12—rail housing
14—reservoir/rail volume for fuel
16—stem of rail housing
18—head end of fuel injector
20—fuel injector
22, 122—adjustable mounting arrangement
24—primary nut
25—vertical wall portion of internal channel 26 (lower threaded region)
26—internal channel of primary nut
27, 127—upper threaded region of internal channel 26
28—upper recess in primary nut
30—external surface of primary nut
32—lower recess in primary nut
34—end surface of primary nut

36—annular seal
38—floor surface of upper recess
40—wall surface of upper recess 28
42—secondary nut
44—lower surface of secondary nut
46—conical-wall portion of lower recess 32
50—spherical head of injector
52—slotted nut
54—slot in slotted nut
56—internal channel of the slotted nut
58—radially outer surface of slotted nut
59—conical recess in the slotted nut
60, 62—perpendicular surfaces of stem

The invention claimed is:

1. An injector and rail assembly for a common rail fuel injection system; the injector and rail assembly comprising:

a fuel injector comprising a head for receiving fuel and a neck region for supporting the head end;

a common rail housing defining a reservoir volume for storing fuel at high pressure and including a stem defining a passage for delivering high pressure fuel from the reservoir volume to the head end of the fuel injector, the stem including a threaded portion, and an adaptable mounting arrangement for sealingly mounting the fuel injector to the stem of the common rail housing, the adaptable mounting arrangement comprising;

a primary nut mounted on the threaded portion of the stem and an annular seal being located on the stem, the primary nut having an internal channel and the head of the fuel injector being received within the internal channel; and a further nut mounted on the neck of the fuel injector so that a radially outer surface of the further nut engages with the internal channel of the primary nut;

wherein the further nut is a slotted nut comprising a slot to enable mounting of the slotted nut into the internal channel of the primary nut.

2. The injector and rail assembly as claimed in claim 1, wherein the annular seal is a C-section annular seal.

3. The injector and rail assembly as claimed in claim 2, wherein the annular seal is formed from metal.

4. The injector and rail assembly as claimed in claim 1, wherein the annular seal is engaged sealingly with an internal surface of the primary nut.

5. The injector and rail assembly as claimed in claim 4, wherein the primary nut is provided with a recess in an end-face of the primary nut, the recess defining the internal surface, and wherein the annular seal is received within the recess.

6. The injector and rail assembly as claimed in claim 1, further comprising a secondary nut mounted on the stem to engage with an external surface of the primary nut as well as interfacing with the annular seal.

7. The injector and rail assembly as claimed in claim 6, wherein the annular seal interfaces sealingly with first and second surfaces of the recess which are perpendicular to one another, with a surface of the secondary nut and with a surface of the stem.

8. The injector and rail assembly as claimed in claim 1, wherein the annular seal interfaces sealingly with first and second surfaces of the stem which are perpendicular to one another and with the internal channel of the primary nut.

9. The injector and rail assembly as claimed in claim 1, wherein the head of the injector includes a substantially part-spherical surface which forms a seal with the internal channel of the primary nut within which it is received.

10. The injector and rail assembly as claimed in claim 9, wherein the internal channel includes a conical-wall region which engages with the substantially part-spherical surface of the head of the injector.

11. An adaptable mounting arrangement for an injector and rail assembly for a common rail fuel injection system, the adaptable mounting arrangement comprising;

a primary nut for mounting on a stem of a common rail housing defining a reservoir volume for fuel, the primary nut defining an injector surface towards the injector, a rail-facing surface towards the common rail housing, and an internal channel for receiving a head end of the fuel injector, in use;

a nut configured to permit mounting of the nut on a neck of the fuel injector, in use, so that a radially outer surface of the nut engages with the internal channel of the primary nut, wherein the nut is a slotted nut comprising a slot to enable mounting of the slotted nut into the internal channel of the primary nut; and an annular seal mountable on the stem of the common rail housing.

* * * * *